(12) United States Patent
Prakash et al.

(10) Patent No.: US 12,045,530 B2
(45) Date of Patent: *Jul. 23, 2024

(54) HISTORIAN INTERFACE SYSTEM

(71) Applicant: AVEVA SOFTWARE, LLC, Lake Forest, CA (US)

(72) Inventors: Ravi Kumar Herunde Prakash, Lake Forest, CA (US); Sudhir Gonugunta, Rancho Santa Margarita, CA (US); Brian Erickson, Long Beach, CA (US)

(73) Assignee: Aveva Software, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,461

(22) Filed: Nov. 16, 2021

(65) Prior Publication Data

US 2022/0179606 A1  Jun. 9, 2022

Related U.S. Application Data

(63) Continuation of application No. 16/733,986, filed on Jan. 3, 2020, now Pat. No. 11,204,732, which is a
(Continued)

(51) Int. Cl.
*G06F 3/14* (2006.01)
*G06F 16/2458* (2019.01)
(Continued)

(52) U.S. Cl.
CPC ............ *G06F 3/14* (2013.01); *G06F 16/2474* (2019.01); *G06F 16/248* (2019.01);
(Continued)

(58) Field of Classification Search
None
See application file for complete search history.

(56) References Cited

U.S. PATENT DOCUMENTS 6,198,480 B1    3/2001 Cotugno et al.
8,001,125 B1 *  8/2011 Magdalin ............... G06F 16/36
                                                        717/124
(Continued)

OTHER PUBLICATIONS

Wonderware® Historian Client Software User's Guide, Invensys Systems, Inc. Jun. 16, 2010 (Year: 2010).*
(Continued)

*Primary Examiner* — Howard Cortes
(74) *Attorney, Agent, or Firm* — Dergosits & Noah LLP; Todd A. Noah

(57) ABSTRACT

A historian interface system provides a graphical representation of tags that represent attributes of a continuous process. A historian system stores the tags and metadata values describing the tags. A display device coupled to the historian system via a communication network displays graphical representations of the tags via display panels and receives selections of the tags. The historian system contextualizes selected tags based on the metadata values describing the selected tag and determines an optimal visualization scheme for the selected tags. The display device displays graphical representations of values of the tags and dynamically determines optimal grouping of the tags based on properties of the display device.

18 Claims, 12 Drawing Sheets

Related U.S. Application Data continuation of application No. 16/201,404, filed on Nov. 27, 2018, now abandoned, which is a continuation of application No. 14/966,195, filed on Dec. 11, 2015, now Pat. No. 10,157,028.

(51) Int. Cl.
  *G06F 16/248* (2019.01)
  *G06T 11/20* (2006.01)
  *H04L 67/10* (2022.01)

(52) U.S. Cl.
  CPC ............ *G06T 11/206* (2013.01); *H04L 67/10* (2013.01); *G09G 2370/027* (2013.01)

(56) References Cited

U.S. PATENT DOCUMENTS

| | | | |
|---|---|---|---|
| 9,760,635 B2* | 9/2017 | Bliss | .......................... G06F 3/06 |
| 2003/0071814 A1 | 4/2003 | Jou et al. | |
| 2003/0236577 A1 | 12/2003 | Clinton | |
| 2006/0059268 A1 | 3/2006 | Victor et al. | |
| 2007/0226626 A1 | 9/2007 | Yap et al. | |
| 2007/0276844 A1 | 11/2007 | Segal et al. | |
| 2008/0189637 A1 | 8/2008 | Krajewski et al. | |
| 2009/0198648 A1 | 8/2009 | Middleton et al. | |
| 2009/0287673 A1 | 11/2009 | Chronister et al. | |
| 2010/0050097 A1 | 2/2010 | McGreevy et al. | |
| 2010/0079499 A1 | 4/2010 | Scott et al. | |
| 2010/0253686 A1 | 10/2010 | Alsbury et al. | |
| 2011/0050702 A1 | 3/2011 | Heimendinger | |
| 2011/0071963 A1 | 3/2011 | Piovesan et al. | |
| 2011/0202149 A1 | 8/2011 | Baier et al. | |
| 2012/0254053 A1* | 10/2012 | Joa | .......................... G06F 16/215 707/732 |
| 2013/0124575 A1 | 5/2013 | Plache et al. | |
| 2013/0289749 A1 | 5/2013 | Mody et al. | |
| 2013/0187926 A1* | 7/2013 | Silverstein | ............ G06F 40/143 345/440 |
| 2014/0049557 A1 | 2/2014 | Hou et al. | |
| 2014/0225895 A1 | 8/2014 | Farchmin et al. | |
| 2014/0330821 A1 | 11/2014 | Tullis et al. | |
| 2014/0331179 A1 | 11/2014 | Tullis et al. | |
| 2015/0066896 A1 | 3/2015 | Davis et al. | |
| 2015/0178286 A1 | 6/2015 | Dhollander et al. | |
| 2015/0186119 A1 | 7/2015 | Chouinard et al. | |
| 2015/0339032 A1 | 11/2015 | Bandera et al. | |
| 2016/0098415 A1 | 4/2016 | Mejeoumov et al. | |
| 2016/0179359 A1 | 6/2016 | Kodejs et al. | |
| 2016/0307344 A1 | 10/2016 | Monnier et al. | |
| 2017/0091968 A1* | 3/2017 | George | .................. G06T 11/206 |
| 2017/0123397 A1 | 5/2017 | Billi et al. | |
| 2017/0147551 A1 | 5/2017 | Kalisz et al. | |

OTHER PUBLICATIONS

Wonderware, "InTouch HMI Tag Viewer Guide", Oct. 9, 2013, pp. 1-28.

* cited by examiner

FIG. 6E

Discrete Data In ON/OFF

HISTORIAN INTERFACE SYSTEM

CROSS-REFERENCE TO RELATED APPLICATIONS

This application is a continuation of U.S. application Ser. No. 16/733,986, filed Jan. 3, 2020, entitled "Historian Interface System", which is a continuation of U.S. application Ser. No. 16/201,404, filed Nov. 27, 2018, entitled "Historian Interface System", which is a continuation of U.S. application Ser. No. 14/966,195, filed Dec. 11, 2015, entitled "Historian Interface System", now U.S. Pat. No. 10,157,028, the disclosures of which are hereby incorporated by reference in their entirety for all purposes.

BACKGROUND

Aspects of the present invention generally relate to the fields of networked computerized industrial control, automation systems, and networked computerized systems utilized to monitor, log, and display relevant manufacturing/production events and associated data, and supervisory level control and manufacturing information systems. Such systems generally execute above a regulatory control layer in a process control system to provide guidance to lower level control elements such as, by way of example, programmable logic controllers or distributed control systems. Such systems are also employed to acquire, manage, store, and preserve historical information relating to processes and their associated outputs.

Typical industrial processes are extremely complex and receive substantially greater volumes of data and information than any human could possibly digest in raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management techniques have been developed to store and maintain the large volumes of data generated by such system. Interfacing with systems that store such data typically includes using special-purpose programming languages with strict syntax regulations regarding queries for data stored on such systems. By way of example, a query based on the Structured Query Language (SQL) is required to adhere to a strict four-part naming convention. Moreover, retrieved data is displayed in a tabular format that does not efficiently convey potential problems associated with the process.

SUMMARY

Aspects of the present invention relate to systems and methods for interfacing with systems storing historical information and presenting the historical information via display devices. Aspects of the present invention provide an interface system configured to display context-based, data-driven display panels for identification, analysis, and processing of time-series data. Moreover, aspects of the invention provide dynamic determination of an optimal visualization scheme for time-series data.

Briefly, a system embodying aspects of the invention comprises a local historian system coupled to a remote display device over a communication network. The local historian system is configured to receive a selection of at least one tag of a plurality of tags from the remote display device over the communication network. The local historian system also includes a computer-readable storage medium and a processor. The computer-readable storage medium stores the plurality of tags and each tag represents an attribute of a continuous process. The computer-readable storage medium also stores one or more metadata values that describe each tag. The processor is configured to execute processor-executable instructions stored on the computer-readable storage medium. The processor-executable instructions include instructions to contextualize the selected tag based on the metadata values describing the selected tag. The local historian system is also configured to transmit the contextualized tag to the remote display device over the communication network.

In another aspect, a method of providing a historian interface system includes displaying, via a graphical user interface (GUI) of a remote display device, a graphical representation of a plurality of tags. Each of the tags represents an attribute of a continuous process and is stored in a memory of a local historian system. The local historian system is coupled to the remote display device via a communication network. The memory of the local historian system also stores one or more metadata values that describe each tag. The method further includes receiving, via the GUI of the remote display device, a selection of the displayed graphical representation of at least one tag of the plurality of tags. A processor of the local historian system contextualizes the selected tag based on the metadata values describing the selected tag. Moreover, the method includes displaying, via the GUI of the remote display device, a graphical representation of a value of the attribute of the selected tag based on said contextualizing.

In yet another aspect, a method of providing metadata values of a tag stored in a historian system includes receiving a search query via a graphical user interface (GUI) on a display device. The method further includes searching a historian system for one or more tags stored thereon. Each tag is defined by a plurality of metadata attributes. The historian system and the display device are connected by a communication network. The method also includes receiving a plurality of the tags stored on the historian system via the communication network. Each received tag has a value for at least one of the plurality of metadata attributes that at least in part matches the search query. A first panel displays via the GUI that includes a graphical representation of each of a plurality of groups. Each group corresponds to one of the plurality of metadata attributes and includes a plurality of subgroups. Each subgroup includes a plurality of received tags that each have a value for a common metadata attribute that at least in part matches the search query. Moreover, the method includes displaying via the GUI a graphical representation of each subgroup on the first panel and receiving via the GUI a selection of the graphical representation of one of the subgroups displayed on the first panel. A second panel displays via the GUI that includes a graphical representation of each of the plurality of received tags comprising the selected subgroup. A selection of the graphical representation of one of the plurality of tags displayed on the second panel is received via the GUI. A third panel displays via the GUI that includes a graphical representation of the value of each of the plurality of metadata attributes of the selected tag.

Other objects and features will be in part apparent and in part pointed out hereinafter.

BRIEF DESCRIPTION OF THE DRAWINGS

FIGS. 6A-6E are diagrams illustrating exemplary tag detail areas of FIG. 3.

Corresponding reference characters indicate corresponding parts throughout the drawings.

DETAILED DESCRIPTION

Figure 1:
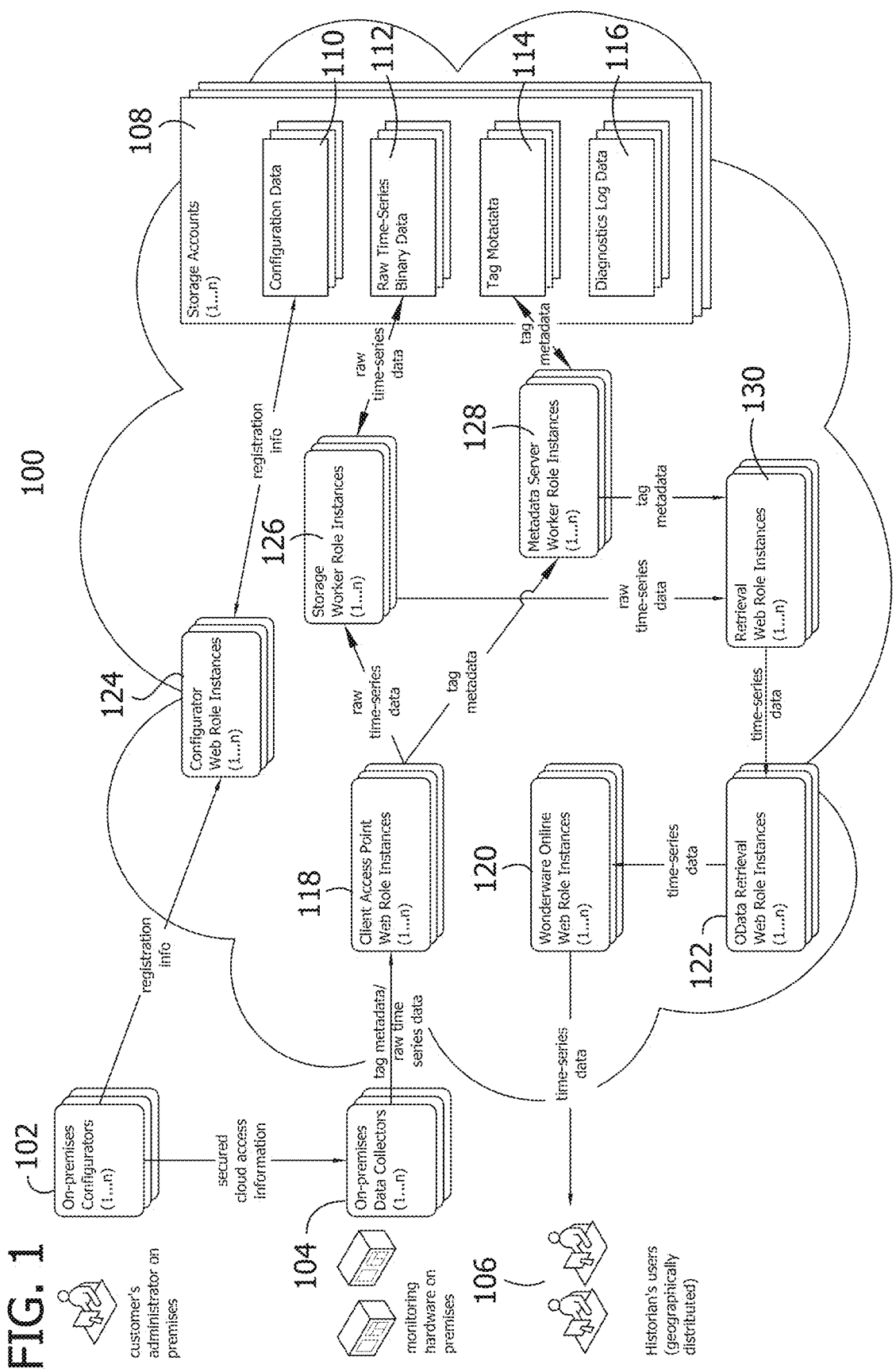
FIG. 1 is a diagram illustrating an architecture of a historian system according an embodiment of the invention.

Referring to FIG. 1, a distributed historian system, generally indicated at 100, enables users to log into the system to easily view relationships between various data, even if the data is stored in different data sources. In an embodiment, the historian system 100 stores and uses data from various locations and facilities and uses cloud storage technology to ensure that all the facilities are connected to all the necessary data. The distributed historian system 100 includes configurators 102, data collectors 104, user devices 106, storage accounts 108, client access point web role instances 118, online web role instances 120, data retrieval web role instances 122, configurator web role instances 124, storage worker role instances 126, metadata server worker role instances 128, and retrieval worker role instances 130. The storage accounts 108 each further include configuration data 110, raw time-series binary data 112, tag metadata 114, and diagnostic log data 116. Aspects of historian system 100 are described further herein and in U.S. patent application Ser. No. 14/833,906, filed Aug. 24, 2015, which is hereby incorporated by reference in its entirety.

The historian system 100 forms connections with configurators 102, data collectors 104, and user devices 106 on which the historian data can be accessed. The configurators 102 are modules that may be used by system administrators to configure the functionality of the historian system 100. The data collectors 104 are modules that connect to and monitor hardware in the process control system to which the historian system 100 is connected, as further described herein. In an embodiment, data collectors 104 access client access point web role instances 118. The user devices 106 comprise computing devices that are geographically distributed, enabling historian data from the historian system 100 to be accessed from various locations across a country or throughout the world. In an embodiment, user devices 106 access online web role instances 120. Additional aspects of user devices 106 are further described herein.

In an embodiment, historian system 100 stores a variety of types of information as data in storage accounts 108. This information includes raw time-series binary data 112 and tag metadata 114. The data collectors 104 of FIG. 1 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user devices 106 receive the time-series data from the online web role instances 120.

In an embodiment, historian system 100 stores metadata in the form of tag objects. Every historian tag object is a metadata instance, which contains tag properties such as tag name, source, data type, unit of measure, value range, interpolation, and description. Moreover, the tag object is uniquely defined by a tag ID, which is, for example, a 16-byte globally unique identifier (GUID). The stored metadata includes values that determine how the associated data values are stored. This includes metadata that indicates whether the associated data value is a floating point value, an integer value, or the like. The metadata includes, for example, an engineering unit range that indicates a range in which the associated data value must reside for the particular engineering units being used. In an embodiment, historian system 100 makes use of the engineering unit range to scale the raw data value when storing it on the data server. For instance, data values may be scaled to values between 0.0 and 1.0 based on the engineering unit range included in the metadata. Because the metadata contains the engineering unit range, the scaled value stored by the historian can be converted back to the raw data value with the added engineering units for presentation to user. For example, if the data value is of a data type known to only return values between −10 and 30, a data value of 30 is scaled to 1.0 and a data value of −10 is scaled to 0.0. A data value of 10 is scaled to 0.5. As a result, the scaled data values as stored on the data server cannot be interpreted correctly without knowing the related metadata in order to convert from scaled value to true value with the appropriate units.

The concept of tags is different from the concept of tag meta data instances. A tag is identified by a tag name, while a metadata instance is identified by tag ID. So for the same tag historian system 100 can have several metadata instances sharing the same name, but having different tag IDs. For example, the same tag could be reconfigured several times along the way. It could be created first as 16-bit unsigned integer, collect some 16-bit data, then reconfigured to be 32-bit unsigned integer, collect some 32-bit data, then reconfigured to 32-bit float. In this example, it comprises a single tag but has three different tag metadata instances identified by tag ID. A tag metadata instance can also be called a tag version. Tracking tag metadata is essential for data processing and, advantageously, the historian tracks what is stored in the raw binary data chunks. The historian stores tag versions in two places: A tag table (and its dependent tables) of a runtime database stores the most recent tag metadata called the current version, and the history blocks, where, for instance, tag metadata for classic tags is stored in files tags.dat, and for the other tags in files taginfo.dat.

Figure 2:
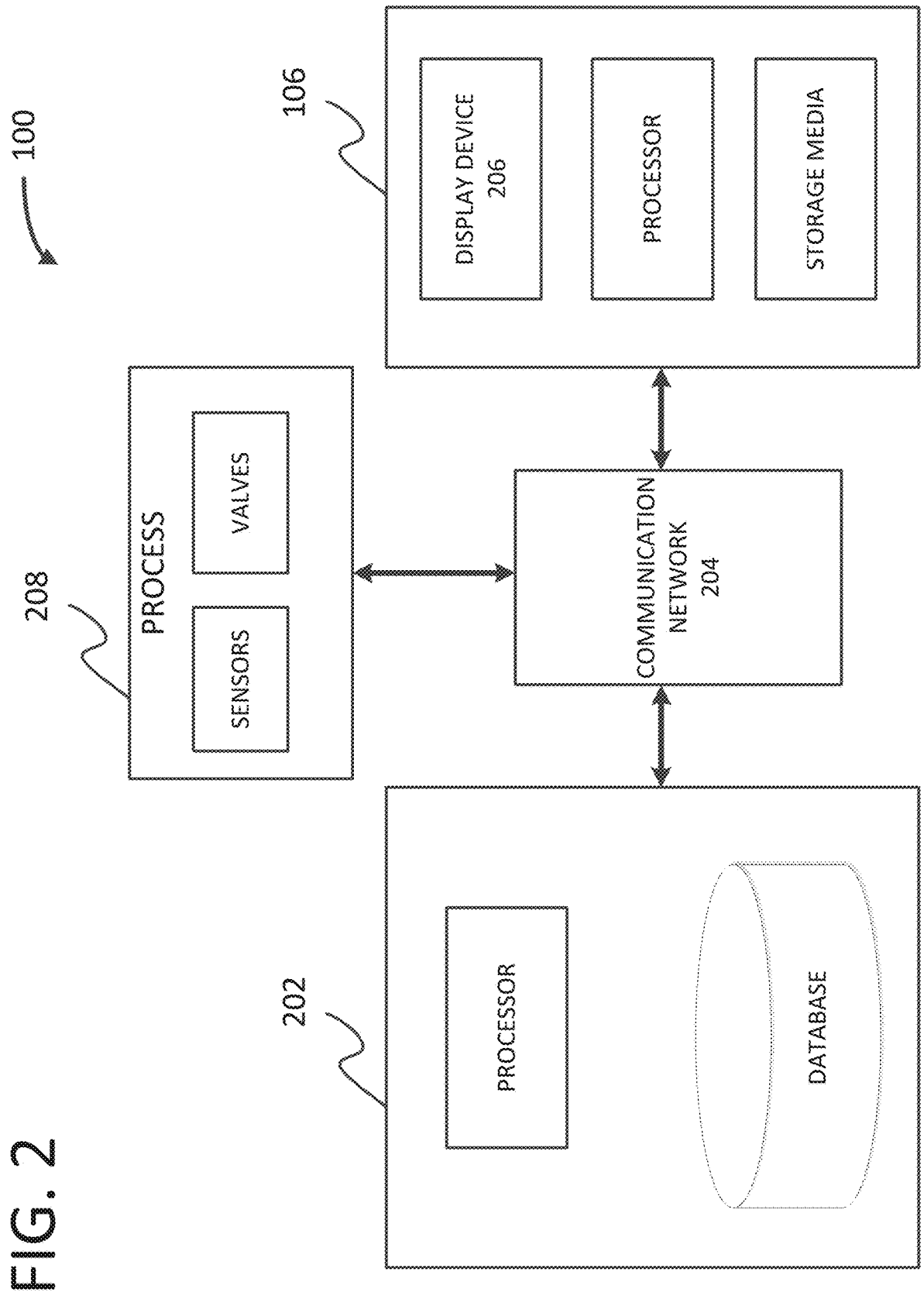
FIG. 2 is an exemplary diagram of the structure of FIG. 1.

FIG. 2 illustrates aspects of historian system 100 including a server device 202, a communication network 204, a continuous processing system 208, and at least one of the user devices 106. The server device 202, user device 106, and aspects of the continuous processing system 208 (e.g., sensor, actuators, etc.) are communicatively coupled via the communication network 204, as further described herein.

The server device 202 is a computing device and includes at least a processor and a storage medium. In an embodiment, the storage medium comprises a database that provides a historian that includes aspects of client access point web role instances 118, online web role instances 120, data retrieval web role instances 122, configurator web role instances 124, storage worker role instances 126, metadata server worker role instances 128, and retrieval worker role instances 130. The storage access accounts 108 may be included in the database of server device 202 according to one embodiment of the invention or stored on remote server devices according to another embodiment of the invention. In another embodiment, server device 202 provides a website-based interface to historian system 100.

The communication network 204 of FIG. 2 is capable of facilitating the exchange of data among aspects of historian system 100, including server device 202, aspects of continuous processing system 208, user devices 106, and/or remote storage accounts. The communication network 204 in the embodiment of FIG. 1 includes local area networks (LANs) and wide area networks (WANs) that are connectable to other telecommunications networks, including other LANs or WANs or portions of the Internet or an intranet. The communication network 204 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communication network 204 is any medium that allows data to be physically transferred through serial or parallel communication channels (e.g., copper, wire, optical fiber, computer bus, wireless communication channel, etc.). In an embodiment, communication network 204 comprises at least in part a process control network. In yet another embodiment, communication network 204 comprises a cloud environment.

Referring further to FIG. 2, the continuous processing system 208 in the illustrated embodiment is adapted for changing or refining raw materials to create end products. Aspects of the present invention are capable of optimizing processes and processing systems that include, but are not limited to, those in the chemical, oil and gas, food and beverage, pharmaceutical, water treatment, and power industries. In an embodiment, continuous processing system 208 includes a process controller that provides an interface or gateway between components (e.g., pumps, valves, sensors) of continuous processing system 208 and other components of historian system 100 (e.g., server device 202, user devices 106). In another embodiment, components of continuous processing system 208 communicate directly with server device 102 and/or user devices 106 via communication network 204. In yet another embodiment, aspects of continuous processing system 208 (e.g., controller) transmits data to and receives data from communication network 204 for controlling and/or monitoring various aspects of continuous processing system 208 (e.g., pumps, valves, sensors).

The user device 106 includes an associated display 206 capable of displaying graphical representations of data (e.g., metadata, time-series data), via a graphical user interface (GUI), regarding aspects of continuous processing system 208. For example, display device 206 may be a touchscreen of a mobile computing device (e.g. smartphone, tablet computing device, laptop) or a monitor of a desktop computing device. In an embodiment, user device 106 also includes a storage medium (e.g., memory) for storing processor-executable instructions of aspects of the invention and a processor for executing processor-executable instructions of aspects of the invention. In another embodiment, user device 106 also includes an interface (e.g., modem, network interface card, wireless communication antenna, etc.) capable of interfacing with communication network 204.

Figure 3:
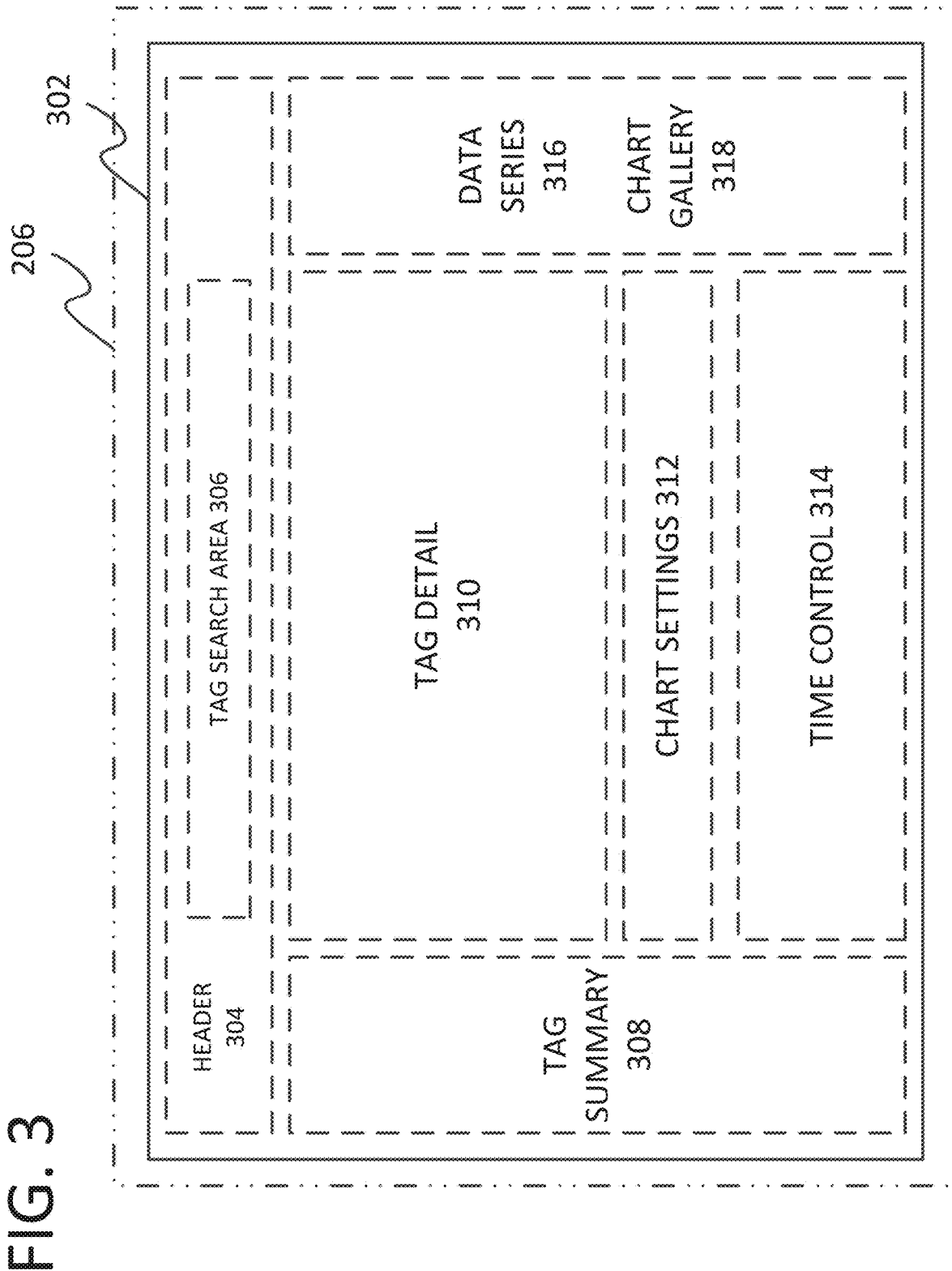
FIG. 3 is a diagram illustrating an exemplary graphical user interface of a historian system according to an embodiment of the invention.

FIG. 3 illustrates an exemplary GUI 302 displayed by display device 206 of a user device 106. The GUI 302 includes a header 304, a tag search area 306, a tag summary area 308, a tag detail area 310, a chart settings area 312, a time control area 314, a data series area 316, and a chart gallery area 318. In an embodiment, GUI 302 comprises a client application of historian system 100. The GUI 302 is referred to as an Information ("Info") Client dashboard in accordance with an embodiment of the invention. In another embodiment, GUI 302 is not shown when a user of user device 106 is not signed in to historian system 100 and is shown when the user is signed in to historian system 100. In yet another embodiment, GUI 302 is shown when a user refreshes a home page of a website interface of historian system 100 provided by server device 202. It is to be understood by one having ordinary skill in the art that a webpage-based embodiment of GUI 302 may include a page lifetime that depends on an application session timeout (e.g., 20 minutes of inactivity).

The header 304 is configured to provide GUI navigation capability for aspects of historian system 100. For example, header 304 may include hyperlinks to a home page, a support page, and the like. The header 304 may also provide a menu of available activities of historian system 100. In an embodiment, header 304 is located substantially near a top portion of GUI 302. In another embodiment, header 304 includes tag search area 306. The tag search area 306 is configured to facilitate a search and selection of tags stored in historian system 100. In an embodiment, tag search area 306 is the only visible (i.e., not hidden) section during a default state of GUI 302. In yet another embodiment, tag search area 306 provides a guided search experience, as further described herein. The tag summary area 308 is configured to display graphical representations of tags selected in tag search area 306, as further described herein. The tag detail area 310 is configured to display graphical representations of values associated with tags selected in tag summary area 308, as further described herein.

The chart settings area 312 of FIG. 3 is configured to display settings applicable for a chart displayed in tag detail area 310 that includes value aggregations. Exemplary value aggregations include, but are not limited to, minimum, average, maximum, sum, last value, and the like. In an embodiment, a user of GUI 302 can apply value aggregation to a tags displayed by tag detail area 310 through a value aggregation combo box (e.g., drop-down menu) that includes various value aggregation types. In another embodiment, an average value aggregation is applied to tag detail area 310 during a default state of GUI 302. In a further embodiment, value aggregations are supported by summary, column, summary grid, and XV plot chart types for analog data types. In yet another embodiment, value aggregations are supported by time-in-state and summary grid chart types for Boolean and string data types. The chart settings area 312 also includes a floating action bar (FAB) that allows a user of GUI 302 to perform various actions on an active chart in tag detail area 310, according to aspects of the invention. Actions supported on an active chart using the FAB include, but are not limited to, save for later, download, share to mobile device, embed content, and share exploration.

The time control area 314 is configured to display time period selections for a current chart displayed in tag detail area 310. In an embodiment, a user of GUI 302 uses the time period selections of time control area 314 to select a time period for the tag values displayed in tag detail area 310. And the time control area 314 of FIG. 3 is configurable to present predefined time periods such as last month, last week, last three days, yesterday, today, and last hour. Time control area 314 may also allow a user of GUI 302 to specify a custom time period. In another embodiment, time control area 314 allows a user of GUI 302 to group tag data displayed in a current chart in tag detail area 310 based on time aggregations. Exemplary time aggregations include, but are not limited to, today-hourly, yesterday-hourly, last three days-hourly, last week-daily, last month-daily, and the like. In yet another embodiment, time aggregation is supported by column, summary grid, detail grid, cumulative sum, and cumulative line chart types for analog data and for a summary grid chart type for Boolean and string data.

The data series area 316 is configured to display tags comprising a group of one or more tags selected in tag summary area 308. The data series area 316 is also configured to allow a user of GUI 302 to select and deselect displayed tags to plot a selected chart in tag detail area 310. In an embodiment, a tag name of each tag is displayed in a shortened form with ellipses and the full tag name is displayed in a tool tip area upon hovering over the tag name with a pointing cursor (e.g., mouse). In an embodiment, each selected tag of data series area 316 is assigned a color that is used to plot values of the selected tag in chart detail area 310. In another embodiment, GUI 302 permits selection of a maximum of twenty tags displayed in data series area 316. In yet another embodiment, a selected tag count out of the total available tags is displayed substantially near a bottom portion of data series area 316. In a further embodiment, a user of GUI 302 can clear the tags selection by clicking on a "clear selection" option displayed substantially near a bottom portion of data series area 316. A user of GUI 302 can view details of each tag in data series area 316 by expanding a tag details drop down option that is displayed near a right portion of each tag. Expanding a tag displays the source, data type, unit of measure, range, interpolation, and description of the expanded tag. The tag details can be collapsed by clicking on a collapse option displayed near a right portion of each expanded tag name.

The chart gallery area 318 of FIG. 3 is configured to display different charts applicable for a selected tag group in tag summary area 308. Applicable charts for the selected tag group are displayed in scrollable tiles in chart gallery area 318. Selection of a chart via GUI 302 will display the respective chart type in tag detail area 310. In an embodiment, a user of GUI 302 can switch between different chart types for the same set of selected tags. In an embodiment in which the selected tags comprise numeric data, the applicable charts include a summary chart, a line chart, a column chart, a summary grid, an XY plot, a trend in state chart, a cumulative sum, a cumulative line, a detail grid, and a diagnostic grid, with the summary chart being displayed in a default state of chart gallery area 318. In an embodiment in which the selected tags comprise discrete data or string data, the applicable charts include a summary chart, a time in state chart, a summary grid, and a diagnostic grid, with the summary chart being displayed in a default state of chart gallery area 318.

In an embodiment, data series area 316 and chart gallery area 318 are mutually exclusive, such that only one is displayed at a given time on GUI 302. In another embodiment, data series area 316 is displayed during a default state of GUI 302. In yet another embodiment, data series area 316 and chart gallery area 318 are of fixed width in all resolutions and can be shown or hidden by clicking on an associated icon on GUI 302.

Figure 4:
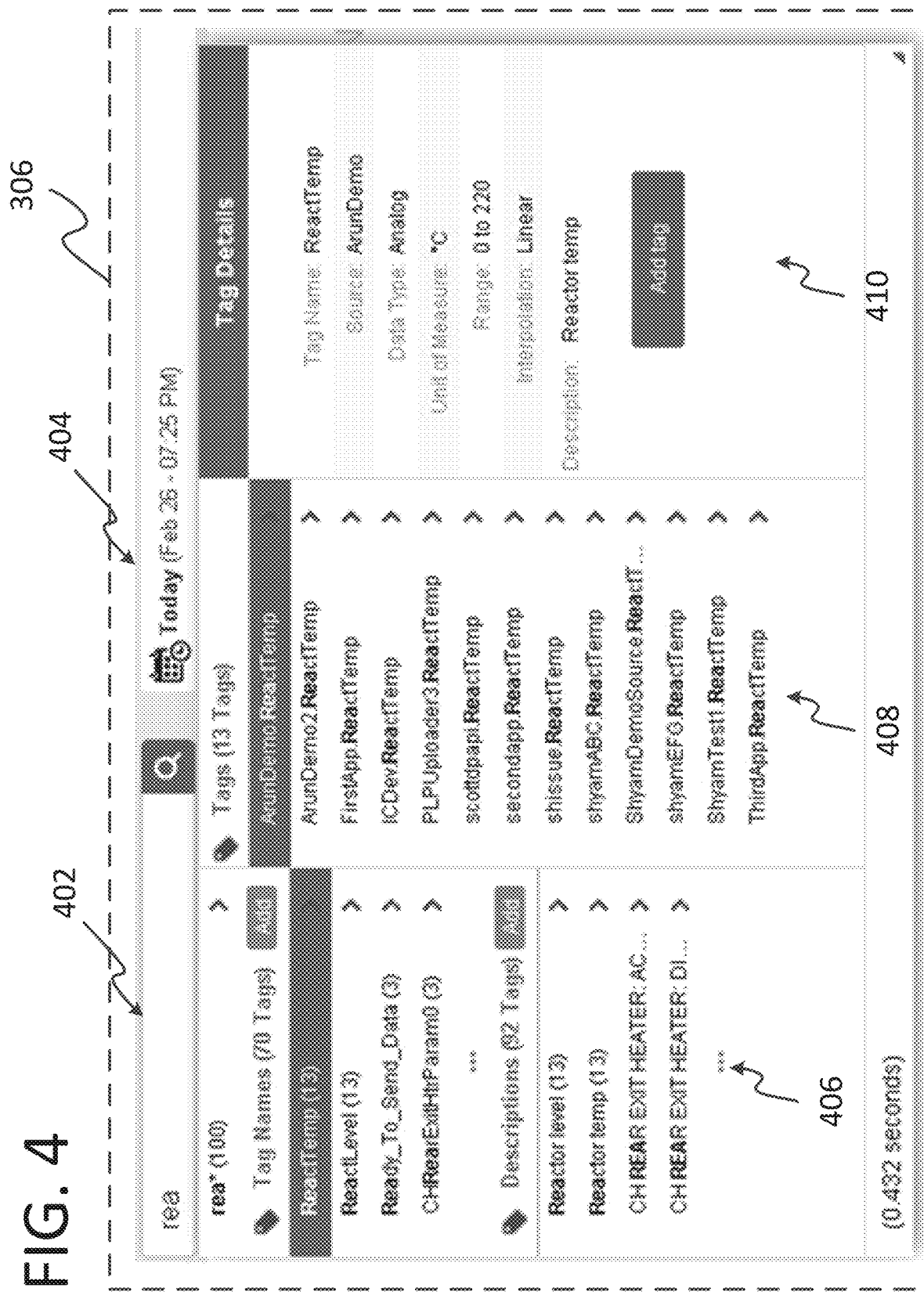
FIG. 4 is a diagram illustrating an exemplary tag search area of FIG. 3.

FIG. 4 illustrates an exemplary embodiment of tag search area 306 that is configured to provide a three-panel guided tag search experience. The illustrated embodiment includes a query area 402, a time period selection area 404, a first panel 406, a second panel 408, and a third panel 410. In an embodiment, the query area 402 and the time period selection area 404 comprise a search section that captures user input and searches server 202 based on contents in this section. In another embodiment, the first panel 406, the second panel 408, and the third panel 410 comprise a results section that displays all results from server 202 as the user enters a search query (e.g., types) in the query area 402. The tag search area 306 is also configurable to provide a search-based system used to find tags stored on server 202 that are of interest for data analysis. Once a set of tags that belong to multiple different groups (e.g., units of measure) are selected by a user of GUI 302 for further analysis, a collection of display panels is dynamically created based on the context of selected tags. The context includes metadata attributes such as a tag type, a tag unit of measure, a tag on and off message, and the like. In an embodiment, this logical grouping allows for easy and efficient visualization and problem solving. In another embodiment, tag search area 306 employs an auto-complete feature to display search results contemporaneously with the entry of a search query.

In the embodiment illustrated by FIG. 4, query area 402 is a text input box with a search icon. From query area 402, a user of GUI 302 can search for a tag by entering the starting letters of the tag name or another tag detail (e.g., source, data type, unit of measure, range, interpolation, and description). Upon entering a query in query area 402, user device 106 queries server 202 for the top one hundred matched tags, according to an embodiment of the invention.

The time period selection area 404 is configured to enable a user of GUI 302 to select a time period such that tag data is limited to the selected time period. In an embodiment, a user of GUI 302 can select a time period in time period selection area 404 to view summary data (e.g., summary bars and summary grid) and detail data (e.g., trend and state) within the selected time period range for selected tags. In another embodiment, a user of GUI 302 can also change the time period to view summary data in various time range periods for the same set of selected tags. In yet another embodiment, a change of the time period by a user of GUI 302 will refresh tag summary area 308 and tag detail area 310 to reflect tags in the selected time period range. Predetermined time ranges include today, last four hours, last twenty-four hours, yesterday, last seven days, last week, and this week, with today being the selected time period range during a default state of GUI 302, in accordance with an embodiment of the invention.

Referring further to FIG. 4, in another embodiment, time period selection area 404 also displays the corresponding browser date time against each time period option. In a further embodiment, a user of GUI 302 can select a custom time period. For example, time period selection area 404 may include a "Custom" option button displayed in a drop-down menu. When a user of GUI 302 selects the "Custom" option button, GUI 302 then displays a dialog box in which the user can select the start time and end time for the custom time period. In an embodiment, the end time is greater than the start time and the time period is prior to a current time period. When an invalid date range is selected, an error message is displayed in the dialog box on GUI 302. Once a valid date is selected, time period selection area 404 updates tag summary area 308, tag detail area 310, and time control area 314 with the selected time range. In an embodiment in which a user of GUI 302 refreshes the page or selects another time period and the custom time range is not persisted, the custom time selection will be lost. In another embodiment in which a user of GUI 302 saves an analysis (e.g., tag detail area 310) with a custom time range, the analysis will be displayed with the same custom time range when the analysis is reloaded.

The first panel 406 is configured to display tags that match the query in query area 402. In an embodiment, the tags are displayed in groups, including All, Tag Names, Sources, Description, Unit of Measure, Type, and Multiple Fields. The groups are comprised of subgroups, which are collections of tags whose values for a certain tag detail match the search query in query area 402. The All group is displayed at a substantially top portion of first panel 406 with an asterisk (e.g., *) mark and includes a unique match for the query in query area 402. The Tag Names group includes tags whose tag name detail match the query in query area 402. The Sources group includes tags whose source detail matches the query in query area 402. The Description group includes tags whose description detail matches the query in query area 402. The Unit of Measure group includes tags whose unit of measure detail matches the query in query area 402. The Type group includes tags whose data type detail matches the query in query area 402. The Multiple Fields group includes tags that match the query in query area 402 for multiple details. In an embodiment, the group name is displayed and the number of tags available in each group is displayed next to the group name. In another embodiment, the first four tags in each group are shown in a default state and a "show more" button is displayed that enables the display of all of the tags in a given group. In yet another embodiment, an "Add" button is displayed for each group to add tags from the group directly and a selection (e.g., clicking, tapping) of the "Add" button by a user of GUI 302 adds the first one hundred tags in that group. In an embodiment, first panel 406 is displayed at a substantially leftmost portion of tag search area 306 and to the left of second panel 408.

The second panel 408 of FIG. 4 is configured to display the tags in a selected subgroup displayed in first panel 406. In an embodiment, second panel 408 displays a maximum of one thousand tags. In another embodiment, second panel 408 includes a heading "Tags ([number of tags] Tags)." When a user of GUI 302 selects (e.g., clicks or taps) a tag name, the tag is added to tag summary area 308 if it is not already present and the tag is removed from tag summary area 308 if it is already present. In an embodiment, each tag in second panel 408 has an associated arrow icon, and selecting the arrow icon causes the details of the selected tag to be displayed in the third panel 410. In an embodiment, second panel 408 is displayed at a substantially center area of tag search area 306 between first panel 406 and third panel 410.

The third panel 410 is configured to display tag metadata details of a selected tag in second panel 408. In an exemplary embodiment, the metadata details include the tag name, source, data type, unit of measure, range, interpolation, and description. In an embodiment, third panel 410 displays an "Add tag" button and selection of the button adds the tag in tag detail area 310 unless that tag is already present in tag detail area 310. In another embodiment, third panel 410 is displayed at a substantially rightmost portion of tag search area 306 and to the right of second panel 408.

In an embodiment, first panel 406, second panel 408, and third panel 410 each include display elements, such as a vertical scroll bar and/or an ellipsis, to indicate there is additional text that does not fit in the horizontal dimensions of the panel. In another embodiment, first panel 406, second panel 408, and third panel 410 are keyboard navigable. For example, a "down arrow" input moves the focus to a next item, an "up arrow" input moves the focus to a previous item, a "right arrow" input displays a panel to the right of the current panel (e.g., second panel 408 when first panel 406 is the current panel; third panel 410 when second panel 408 is the current panel) and selects the first item in the newly displayed panel, and a "left arrow" input moves the focus back to the previous panel from where the current panel originated. An "Esc" (e.g., escape) input closes the search panel by no longer displaying tag search area 306. An "Enter" input adds a selected tag to tag summary area 308 and adds all items from the first All group when no item is selected and then closes the search panel by no longer displaying tag search area 306. It will be understood by having skill in the art that input devices may include a physical keyboard connected to user device 106 and a touchscreen keyboard displayed via GUI 302 on display device 206. In an embodiment in which an item in any of first panel 406, second panel 408, and third panel 410 is focused by a mouse pointing device, a user may navigate using a keyboard from the item on which the focus is directed. In another embodiment, the results section comprised of the panels is resizable and enlarging the results section with a resize handle increases the width of the rightmost displayed panel and/or increases the height of all displayed panels. In yet another embodiment, each of first panel 406, second panel 408, and third panel 410 is provided with a splitter that enables increasing or decreasing the width of the panel.

Figure 5:
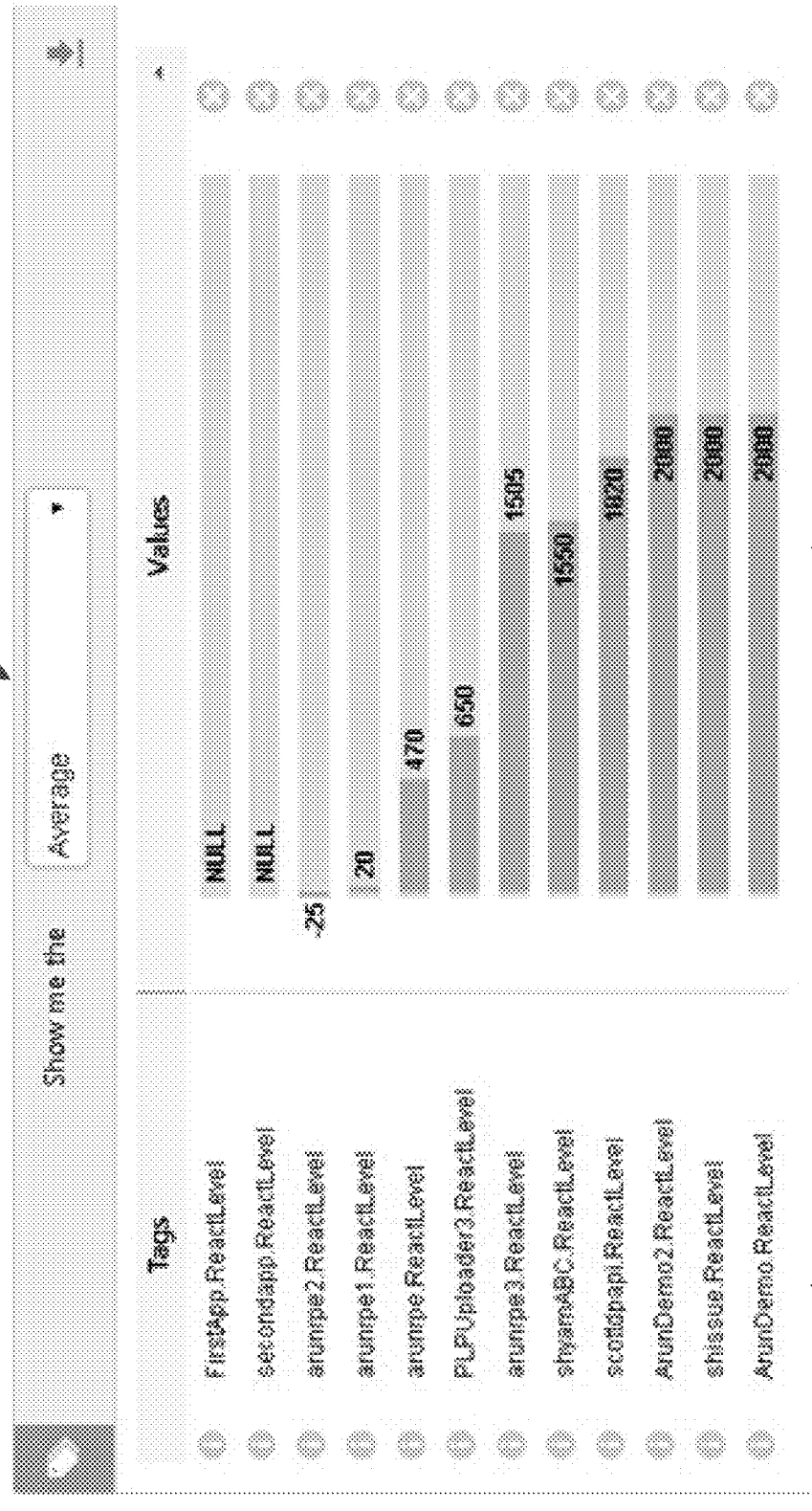
FIG. 5 is a diagram illustrating an exemplary tag summary area of FIG. 3.

FIG. 5 illustrates an exemplary embodiment of tag summary area 308 that is configured to display tags summary data of tags selected in tag search area 306. In an embodiment, a maximum of one hundred tags are displayed in tag summary area 308. Tags summary data in tag summary area 308 are displayed in either a grid format or a chart format. The chart format is, for example, the default view and is represented by a bar chart. The bar chart represents tag data in the form of aggregates such as tag maximum value, tag minimum value, tag average value, last tag value, and total tag values for a selected time period range. In an embodiment, an aggregate type combo box 502 displays the aggregate types for selection by a user of GUI 302. For example, tag average value is the default aggregate type. Selection of an aggregate type will redraw the bar chart in tag summary area 308 to the selected aggregate type. In an embodiment, tag names 504 are displayed at a substantially left portion of tag summary area 308 and tag values 506 are displayed at a substantially right portion of tag summary area 308. In another embodiment, the bar charts are grouped against an engineering unit, with each bar chart representing one engineering unit. In this embodiment, the x-axis of each bar chart represents an engineering minimum and an engineering maximum. In yet another embodiment, a user of GUI 302 selects tags displayed in tag summary area 308 for detail view in tag detail area 310, selected tags are highlighted by a color indicator shown against the tag name, and selected tags are highlighted in the grid format to keep the bar chart format and grid format in sync. A maximum of number of tags (e.g., 20) may be selected from tag summary area 308 for detail view in tag detail area 310 and a maximum tag count reached message is displayed after the addition of twenty tags. In yet a further embodiment, a user of GUI 302 can deselect tags in tag summary area 308 that removes those tags from tag detail area 310.

An exemplary bar chart format of tag summary area 308 as shown in FIG. 5 includes a hover effect when a user of GUI 302 utilizes a pointing device (e.g., mouse). Upon moving the pointing device over a tag value 506, the tag value 506 will change (e.g., decrease) in opacity to indicate that the bar may be selected for detail analysis. An embodiment that includes negative values for certain bar charts of tag summary area 308 will adjust the display of all bar charts and negative values will be displayed on a left hand side of a value bar that indicates a zero value. In an embodiment, tag summary area 308 displays an optimized value such that if the length of the tag value is greater than the length of the value bar, then the tag value is displayed from the beginning of the tag and if the value bar length is greater than the length of the tag value then the tag value is displayed in the middle of the value bar. In yet another embodiment, tag summary area 308 can resize bar charts such that on the resize of a browser window, the bar charts self-adjust such that there is no overlap of tag value bars 506 and tag names 504. In an embodiment, the total value of a tag is the area under the value curve of a retrieval cycle provided by the formula: Sum(value*delta t)/Total time of integral in all cycles, where delta tis prorated for any partially contained storage cycles. For tags with analog data types, the calculation is: Sum (value*delta t)/Total time, which is similar to the values returned by an integral query against a history table for a cycle of the same length where the history row DateTime is the same as the EndDateTime. In another embodiment, a download button option is displayed in tag summary area 308 that enables a download of the newly added metrics to a .CSV file.

Referring further to FIG. 5, an exemplary grid format of tag summary area 308 includes the tag data in tabular format with columns for source, tag, type, units of measure, minimum, maximum, average, quality ID, quality status, and description. In a grid format, a user of GUI 302 cannot select the tags, but the tags selected from the grid are highlighted by displaying a color indicator against the tag name row. In the grid format, a user of GUI 302 can delete tags that will be removed from the bar chart as well. In an embodiment, the grid format shows an ellipsis (e.g.," . . . ") in columns to indicate a fetch of data (e.g., from server 202) is in progress. In an embodiment, a grid format is not grouped as engineering units and the tags are displayed as one group. In another embodiment, tag summary area 308 includes an information button that enables the display of details about a particular tag in a pop-up window. In yet further exemplary embodiments, tag summary area includes a refresh data button that enables updating tag summary area for a selected time range and a reload button that clears all tags in tag summary area 308 and also cancels all pending requests for addition and updates.

Figure 6A:
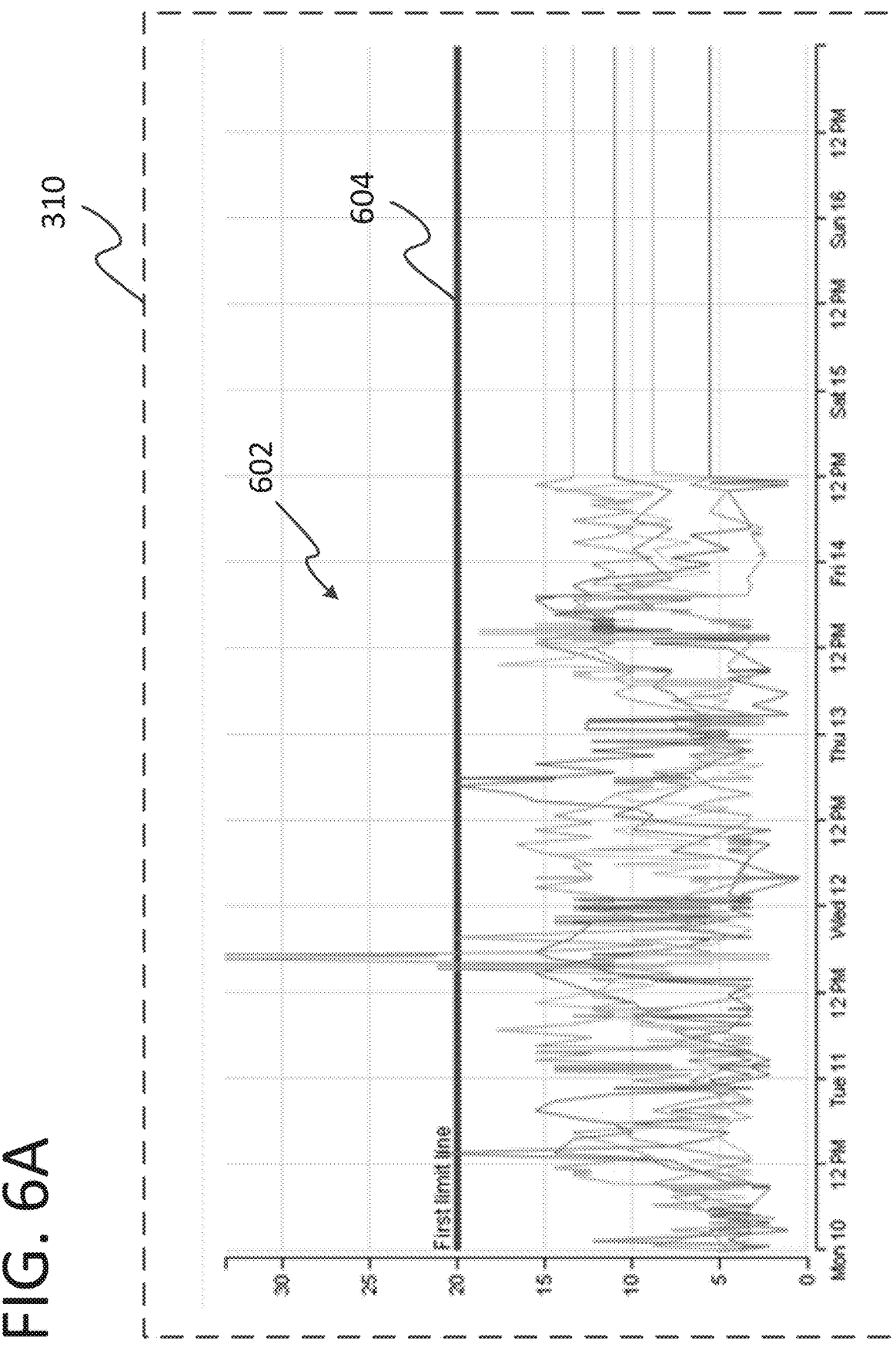
Figure 6B:
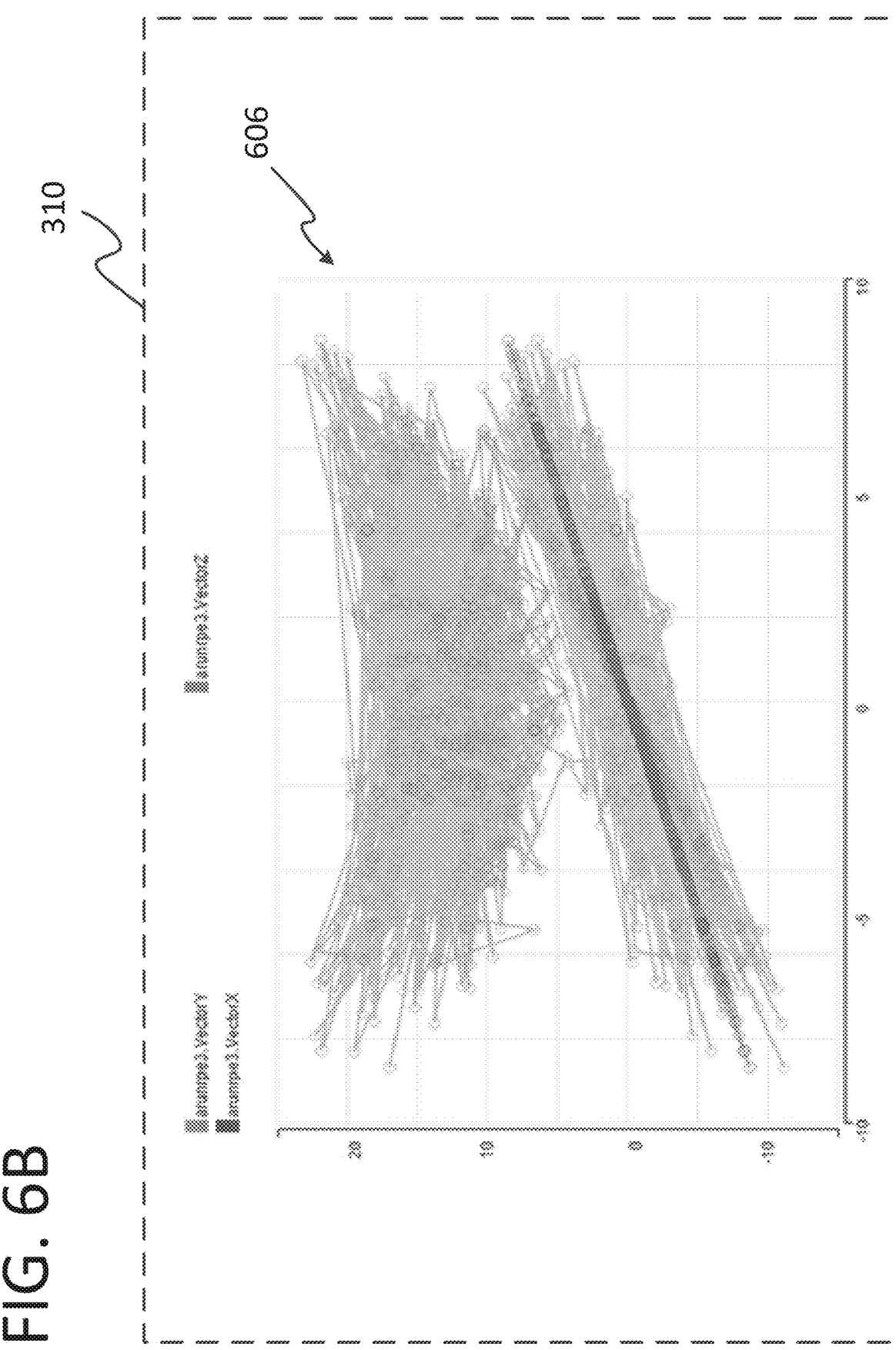
Figure 6C:
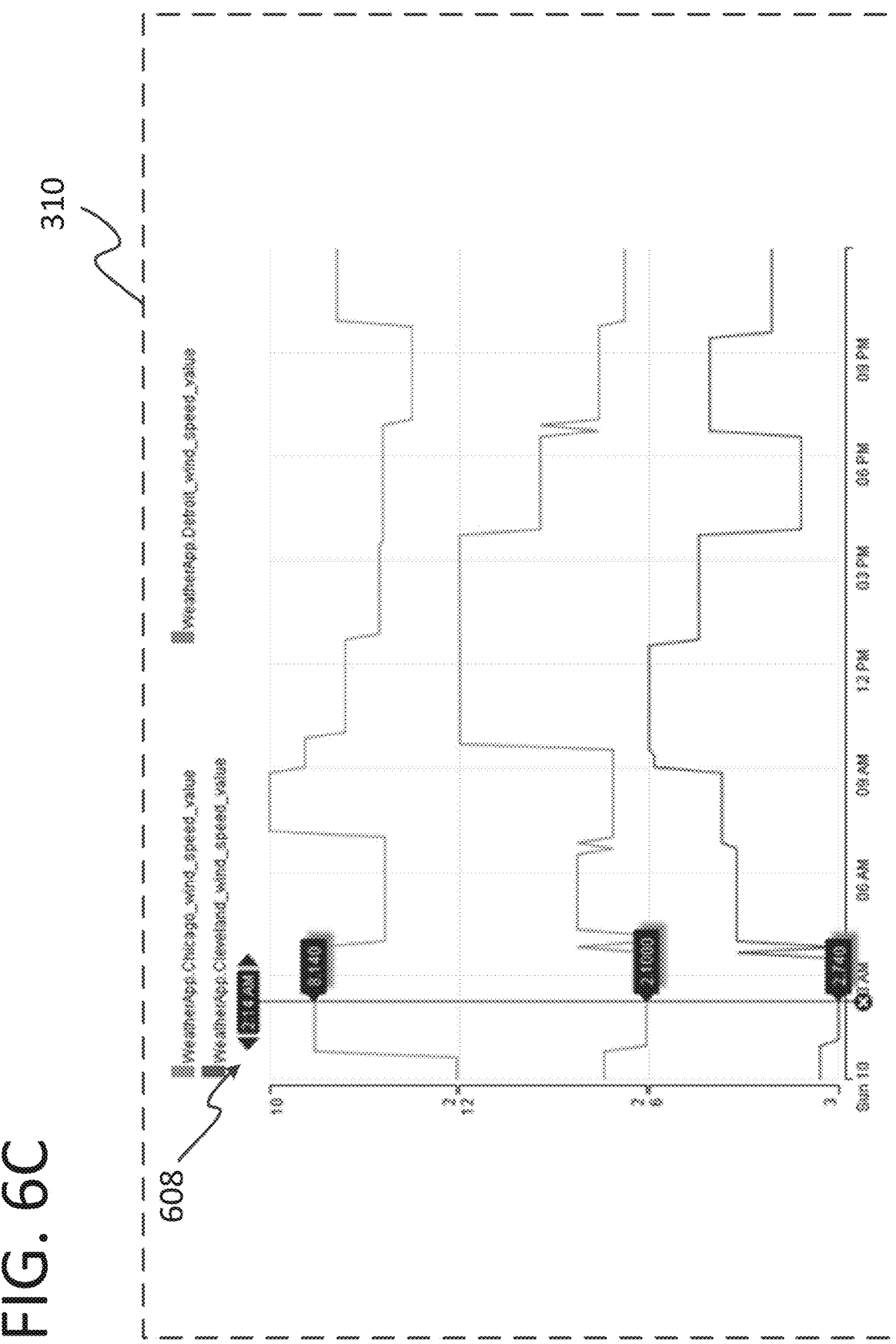

FIGS. 6A-6C illustrate exemplary embodiments of tag detail area 310 configured to display values of tags selected in tag summary area 308. In an embodiment, tag detail area 310 enables a user of GUI 302 to analyze a maximum of fifteen tags selected in tag summary area 308. In accordance with aspects of the invention, once a user of GUI 302 selects tags from tag summary area 308, user device 106 dynamically determines an optimal visualization scheme based on the context of the metadata of the selected tags. For example, user device 106 may dynamically determine to display analog values of selected tags as a line chart and discrete and string values as a time in state chart in tag detail area 310. The contextualization and dynamic determination of the optimal visualization scheme in the illustrated embodiment allow for efficient analysis of tag data to arrive at process problems. In yet another embodiment, when tag data values are displayed via a certain visualization scheme, user device 106 displays the tag value data optimally for the area of GUI 302. For example, when a graphical representation of the tag data values for each selected tag can be displayed in the optimal visualization scheme within the boundaries of GUI 302 then each selected tag will have its own graphical representation. When the graphical representation of the tag data values for a selected tag exceeds the boundaries of GUI 302 then user device 106 groups certain tag data values together for display as a single graphical representation. For example, on a desktop computing device, eight unique groups of tag data values may be displayed with a ninth group displayed that comprises a group of tag data values and labeled as "others." On a tablet computing device, for example, three unique groups of tag data values may be displayed with a fourth group displayed that comprises a group of tag data values and labeled as "others." In an embodiment, user device 106 dynamically determines an optimal number of groups of tags that can be displayed as graphical representations on GUI 302 based on a form factor of user device 106.

FIG. 6A illustrates tag detail area 310 with a line chart used to show trend lines 602 of selected tags for a selected time duration. In an embodiment, the line chart is displayed for analog tags selected in tag summary area 308. Selecting a tag in tag summary area 308 adds a corresponding line on the line chart of tag detail area 310 and deselecting a tag in tag summary area 308 removes a corresponding line on the line chart of tag detail area 310. The trend lines 602 on the line chart are displayed for a selected time duration and when a user of GUI 302 changes the time duration, as further described herein, trend lines 602 are automatically redrawn in response to the change to match the changed time duration. In an embodiment, the y-axis scale starts from the lesser of zero and a minimum data value or engineering unit of all selected tags. In another embodiment, the y-axis scale has a maximum value of the greater of zero and a maximum data value or engineering unit of all selected tags. In yet another embodiment, the x-axis displays the selected time duration, the trend lines 602 follow a linear interpolation, and the trend lines 602 match the color of tags in data series area 316.

FIG. 6A also illustrates a limit line 604 to annotate the line chart at a specified value point in the y-axis. In this embodiment, a setting dialog on the line chart displays configuration options for limit line 604. A user of GUI 302 can enable and disable the display of limit line 604 by selecting a "draw limit lines on line chart" option in the configuration options. In an embodiment in which limit line 604 is enabled, a user of GUI 302 can provide the values indicating where limit line 604 should be displayed on the line chart. In yet another embodiment, a user of GUI 302 can provide text that will be displayed above limit line 604. In an exemplary embodiment, limit line text has a two hundred character limit. In another exemplary embodiment, a user of GUI 302 can enter a numeric value in a "limit line value" input box and when the y-axis of the line chart is in that range, limit line 604 is displayed at that value. When the y-axis of the line chart is not in that range, limit line 604 will not be displayed.

FIG. 6B illustrates tag detail area 310 with a scatter plot (i.e., scatterplot, scattergraph) using Cartesian coordinates to display values for two or more variables for a set of data of tags selected in tag summary area 308. In the illustrated embodiment, the data is displayed as a collection of points each having the value of one variable determining the position on the horizontal axis and the value of the other variable determining the position on the vertical axis. In an embodiment, the illustrated scatter plot enables the display of the relationship between the variables to depict any problems or issues with the data or unique (i.e., interesting) aspects of the data.

When a tag is selected in tag summary area 308, the tag detail area 310 displays, for example, a line chart. At this instant, time is the x-axis. A user of GUI 302 can then switch tag detail area 310 to a scatter plot as shown in FIG. 6B by selecting a different tag in the x-axis (e.g., via a drop-down menu displayed in tag detail area 310). In the same way, the user of GUI 302 can switch back to the line chart by selecting time in the axis (e.g., via the drop-down menu in tag detail area 310). In another embodiment, when a user of GUI 302 selects a different tag, other than time in the x-axis, aspects of the invention that control the line chart receive an event to set the x-axis (e.g., setXAxisevent). During this event, aspects of the invention that control the line chart check whether tag detail area 310 is currently displaying a line chart or a scatter plot. When a line chart is currently displayed, the control aspects clear all data that was captured to display the line chart and switches to a scatter plot. Upon receiving instructions to switch to a scatter plot, the control aspects remove all lines that are currently displayed on the line chart, change the y-axis from time scale to linear scale, and append a "loading . . . " status to items in a chart legend. The control aspects then fetch process values data for all y-axis and x-axis tags using cyclic retrieval. After receiving the data, the control aspects display the scatter plot in tag detail area 310. In an embodiment, all the data points in the scatter plot are drawn as a circle with a radius of four, an opacity of one-half, and with the same color as the tag selected in tag summary area 308. After plotting data points as circles, lines are displayed connecting the data points. In yet another embodiment, three options are displayed in a panel header in tag detail area 310. The three options include whether to display the scatter plot with lines and circles or just circles alone (e.g., toggle switch), whether to show engineering unit ranges for the x-axis and y-axis in the scatter plot, and an option to download the scatter plot data.

FIG. 6C illustrates an exemplary embodiment of tag detail area 310 with a line chart that includes a scooter 608 configured to display values at positions where the scooter 608 intersects with the line chart. The illustrated embodiment includes a single scooter, but one having ordinary skill in the art will understand that multiple scooters may be utilized. In an embodiment, a user of GUI 302 can drag scooter 608 across the line chart. The tooltip on scooter 608 displays the current value of the line at that position of the scooter. For example, in the embodiment illustrated by FIG. 6C, the scooter is at 2:14 AM and the value of the top line is 8.140, the value of the middle line is 2.100, and the value of the bottom line is 2.740 at this position. A user of GUI 302 can remove scooter 608 by selecting a removal indicia (e.g., cross mark) at the bottom of the scooter line. In an embodiment, a time display in a rectangle at a bottom portion of scooter 608 uses a d3 nice time format. When a tag is removed from display in tag detail area 310, the scooter 608 for that tag is removed. In an embodiment, values displayed a flag of scooter 608 are displayed with three significant digits. When a flag of scooter 608 is too big to be adjusted at the right side, the display of scooter 608 will compensate at the left side. When scooter 608 is between two ticks along the x-axis and the difference between the ticks is greater than twenty-four hours then scooter 608 displays the text in a tooltip with the date and time.

Figure 6D:
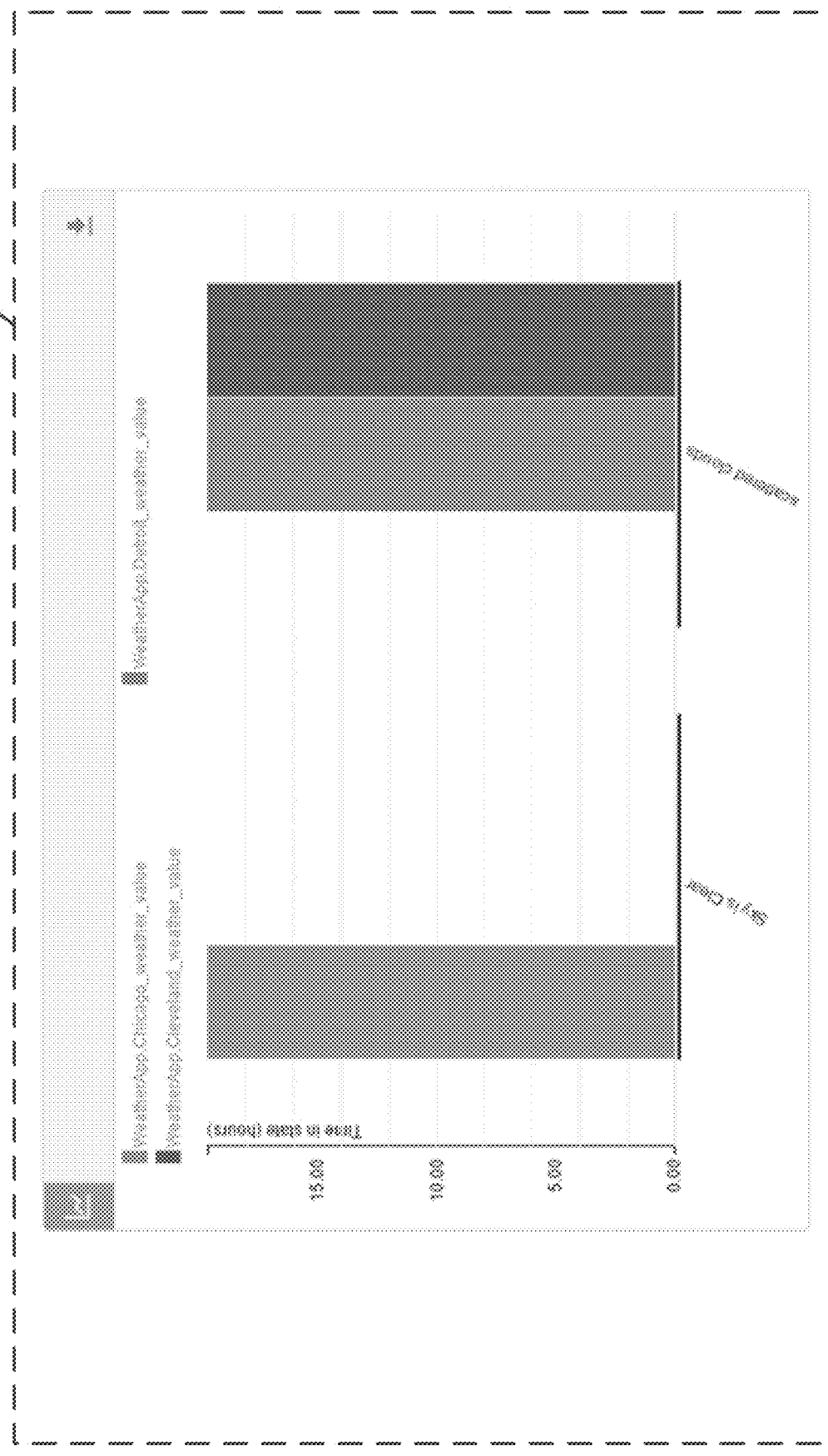

FIG. 6D illustrates an exemplary embodiment of tag detail area 310 with a time in state chart configured to display different states of non-analog tags selected in tag summary area 308. In addition, the time in state chart is configured to display information about how long a tag stayed in a particular state. Each bar in the chart represents a state for a particular tag. In the illustrated time in state chart, the left bar represents a state in which the sky was clear and the two right bars represent a state in which there were scattered clouds in the sky. In an embodiment, all displayed bars related to a certain tag are filled with the same color of the selected tag. In another embodiment, the time in state chart is displayed in tag detail area 310 when a tag is selected from a non-analog tags grid. When a tag is either unselected or deleted from a non-analog tags grid or from a grid view, it will be removed from the time in state chart also. When all tags are removed from the chart, then the chart is hidden (i.e., not displayed). In an embodiment, the time in state chart includes two axes and a legend. An x-axis is illustrated at a bottom portion of the chart and y-axis is illustrated at a left portion of the chart. Labels in the x-axis represent tag states and labels in the y-axis represent the time spent by all states. In an embodiment, labels in the x-axis show a full name of the state if the name is less than twenty characters. In an embodiment in which the name of a state is greater than twenty characters, the first twenty characters are displayed in addition to an ellipsis. In another embodiment, a tooltip containing the full name of the state is displayed when a user moves a pointing cursor on an x-axis label. In yet another embodiment, the y-axis has another label apart from the time label that shows seconds, minutes, hours, and days based on the data. Each bar of the time in state chart represents a state and includes a color corresponding to that of the selected tag in a non-analog tags grid. When a user moves a pointing cursor over a bar, a tooltip is displayed that includes information of how long the tag was in that state. In an embodiment, each bar maintains a minimum width of ten pixels. If the width of a bar is less than ten pixels after adding additional tags, the time in state chart will consolidate some of the states (e.g., less prioritized states, states with lesser values) into a new state identified as "other states" until the width of the bars are ten pixels. In an embodiment that includes an "other states" group, the label of this group displays the number of states that are consolidated into this group.

In an embodiment, a legend is displayed at a substantially top portion of tag detail area 310 in connection with a time in state chart. For example, the legend includes an entry for each tag with an icon and a label that consists of the fully qualified name (FQN) of the tag. When an icon is selected in the legend, the corresponding tag is removed from the time in state chart and the same tag is unselected from the non-analog tags grid. The label in the legend will display an ellipsis when the tag name is greater than the width of the legend. When the time in state chart is waiting for data (e.g., from server 202) for a tag, "loading . . . " is displayed near the tag name in the legend and then removed once the data is received by user device 106. In another embodiment, the data of the time in state chart is refreshed when the time duration is changed or when a refresh button is selected. In yet another embodiment, the time in state chart dynamically resizes when a tag is added and/or deleted from the non-analog tags grid, when the window is resized, or when the view is changed from grid format to chart format. In another embodiment, the time in state chart has a minimum and maximum height of five hundred pixels.

In accordance with aspects of the invention, the time in state chart includes four aggregate options, including split time-total, contained time-minimum, contained time-maximum, contained time-average, and contained time-summary. In an embodiment, the aggregate options are displayed in a drop-down menu. The split time option uses split data of the tag to display the time in state chart. Split data contains an array of data in which each data represents a state of a tag. Each displayed bar with the split time option represents a total time of a state during a retrieval cycle that is specified by selecting a "time selection" option, including state occurrences that fall partially within the period. The contained time option uses contained data of the tag to display the time in state chart. Contained data contains an array of data in which each piece of data represents a state of a tag. Each displayed bar with the contained time-minimum option represents a minimum time of a state during a retrieval cycle that is specified by selecting the "time selection" option, excluding state occurrences that fall only partially within the period. Each displayed bar with the contained time-maximum option represents a maximum time of a state during a retrieval cycle that is specified by selecting the "time selection" option, excluding state occurrences that fall only partially within the period. Each displayed bar with the contained time-average option represents an average time of a state during a retrieval cycle that is specified by selecting the "time selection" option, excluding state occurrences that fall only partially within the period. The contained time-summary option represents contained time (i.e., minimum, average, and maximum) of a state during a retrieval cycle that is specified by selecting the "time selection" option, excluding state occurrences that fall only partially within the period.

In an embodiment, when a line chart format is used, tag detail area 310 displays different line charts corresponding to various states of a discrete tag upon selection of a discrete tag. In an embodiment in which the number of states is more than four, tag detail area 310 displays line charts for the first four states of the selected discrete tag. In an embodiment in which the number of states is less than four, tag detail area 310 displays line charts for available states of the selected discrete tag.

Figure 6E:
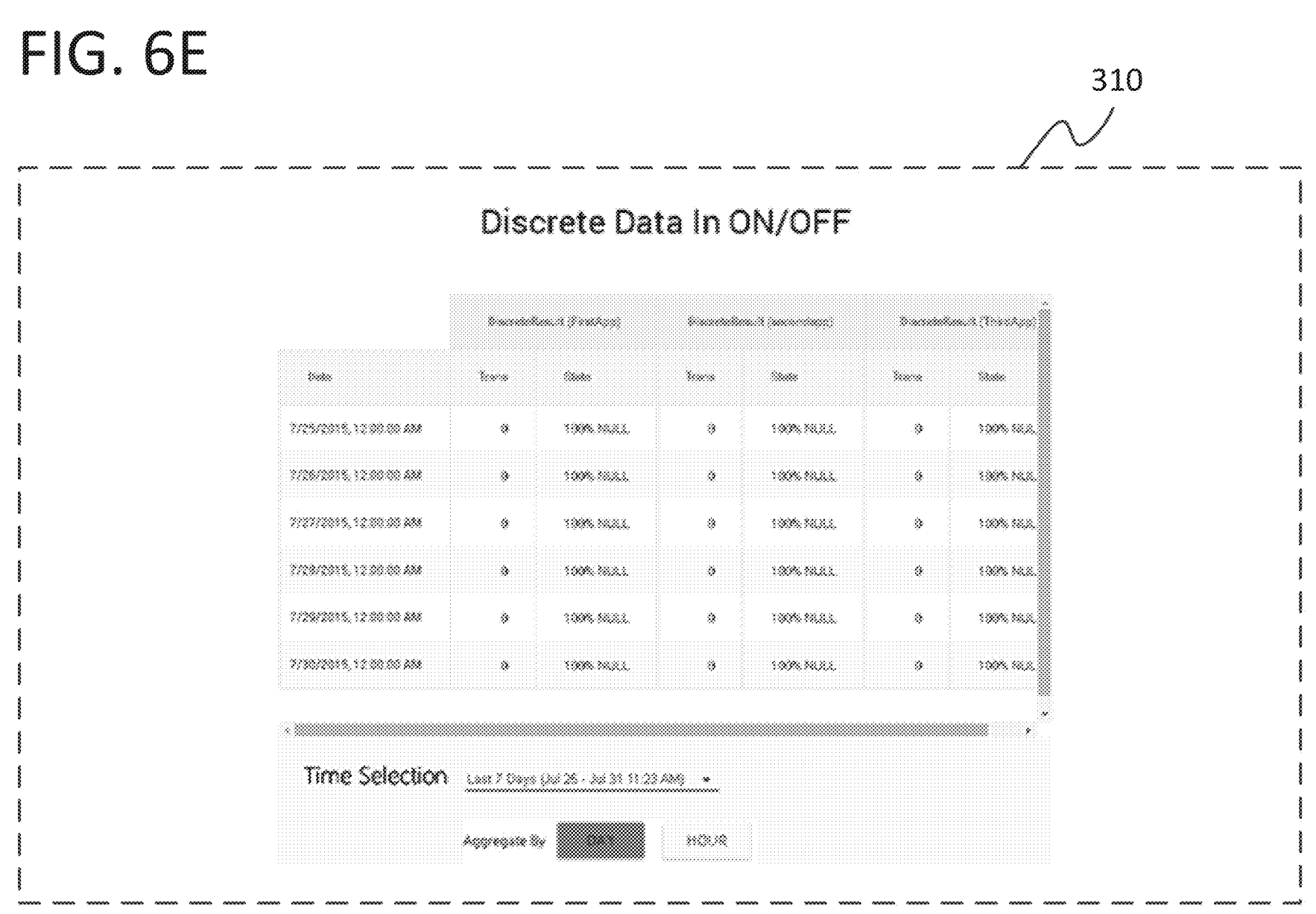

FIG. 6E illustrates an exemplary embodiment of tag detail area 310 with a grid configured to display data of tags selected in tag summary area 308. In an embodiment, the grid is a detail grid that displays last, total, minimum, maximum, and average aggregate values for analog tags selected in tag summary area 308. In another embodiment, the grid is a summary grid that displays more specific last, total, minimum, maximum, and average aggregate values for both analog and non-analog tags selected in tag summary area 308. A combo box is displayed in tag detail area 310 to allow a user of GUI 302 to select the specific aggregate value. In another embodiment, the grid is a diagnostic grid that displays a tag source name, a tag name, a tag type, a numeric quality identification of the tag (Quality ID), a textual representation of the tag (Quality Status), and a tag description for both analog and non-analog tags selected in tag summary area 308. The diagnostic grid additionally displays for analog tags a last value of the tag, a total value of the tag, a minimum value of the tag, a maximum value of the tag, and an average value of the tag all for a selected time duration.

Figure 7:
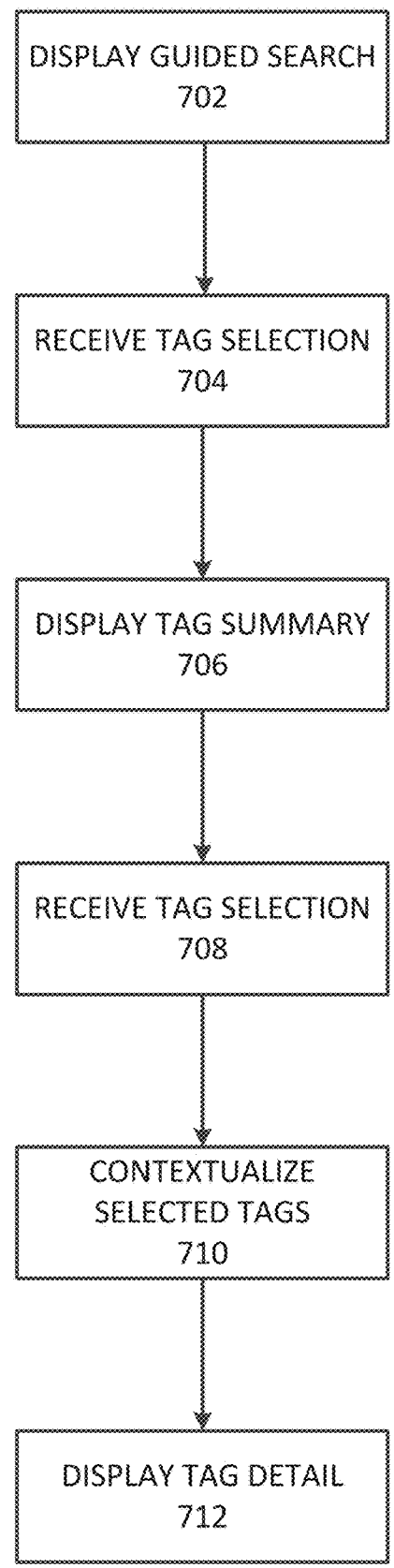
FIG. 7 is a diagram illustrating an exemplary method of providing a historian interface system according to an embodiment of the invention.

FIG. 7 is an exemplary flow diagram illustrating a method of providing a historian interface system embodying aspects of the invention. At step 702, a GUI (e.g., GUI 302) displays a guided search experience, as further described herein. The historian interface system receives a selection of one or more tags from the guided search experience at step 704. In response to the tag selections, the GUI displays summary information about the selected tags at step 706. In an embodiment, step 706 is accomplished via tag summary area 308, as further described herein. At step 708, the historian interface system receives a selection of the displayed summarized tags. These selected tags are contextualized based on metadata values describing the selected tags. For example, a common characteristic, such as an analog data type, is used to contextualize the selected tags. The details of the contextualized tags are displayed at step 712. In an embodiment, the contextualized tags are displayed in tag detail area 310 via a chart based on the contextualization.

Figure 8:
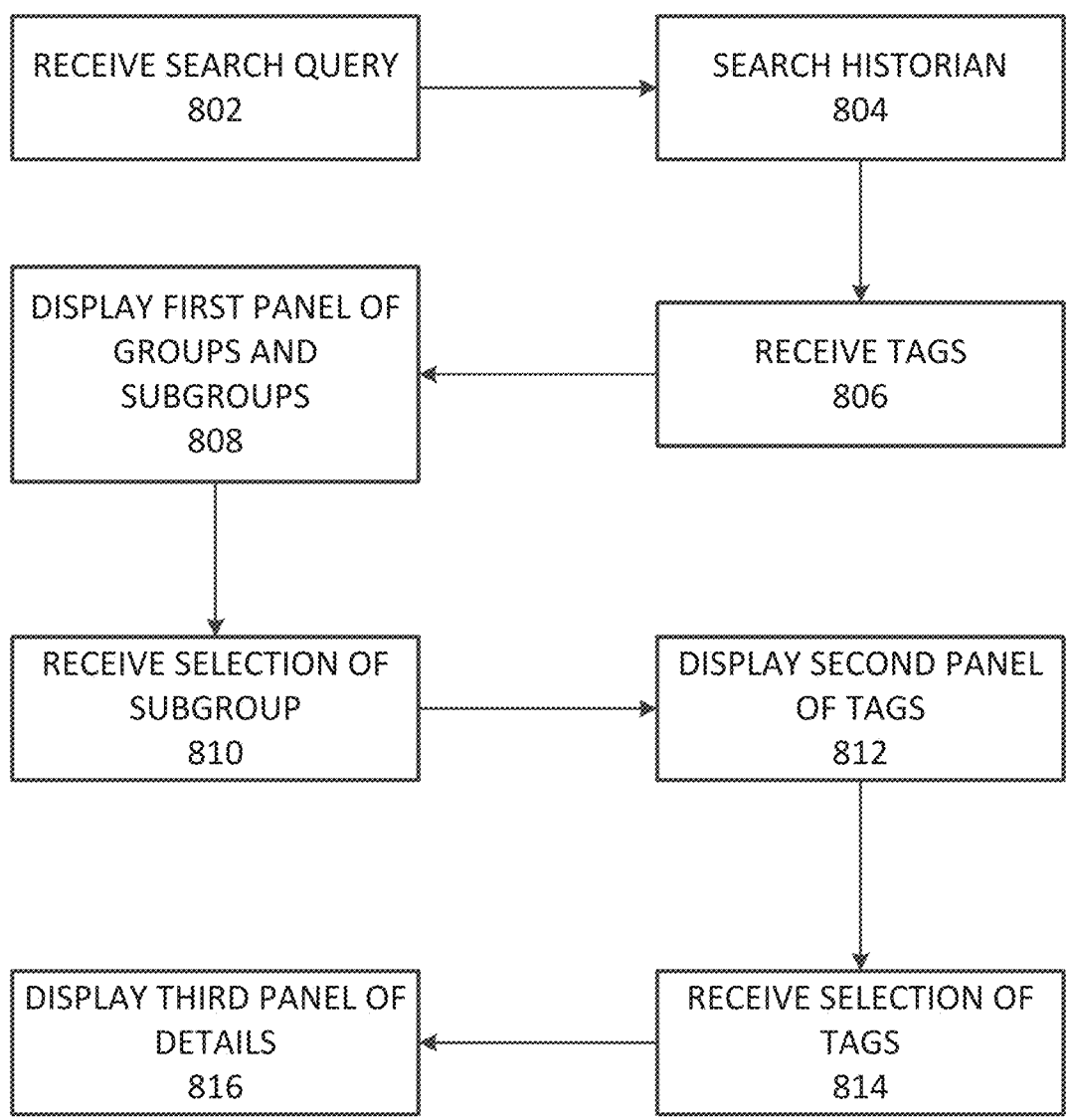
FIG. 8 is a diagram illustrating an exemplary method of providing metadata values of a tag according to an embodiment of the invention.

FIG. 8 is an exemplary flow diagram illustrating a method of providing metadata values of a tag embodying aspects of the invention. At step 802, a historian interface system (e.g., user device 106) receives a search query via a GUI (e.g., GUI 302) on a display device (e.g., display device 206). The interface system searches a historian system (e.g., server 202) coupled via a communication network (e.g., communication network 204) for tags that are defined by metadata attributes at step 804. At step 806, the historian interface system receives tags from the historian system that, at least in part, match the search query. At step 808, the interface system displays a first panel via the GUI. The first panel includes groups of metadata attributes. The groups include subgroups that further include one or more of the received tags that each has a value for a certain metadata attribute that at least in part matches the search query. At step 810, the historian interface system receives a selection of one of the subgroups of the first panel. In response, the interface system displays a second panel via the GUI that includes the tags of the selected subgroup at step 812. At step 814, the historian interface system receives a selection of one of the tags displayed in the second panel. At step 816, the historian interface system displays the value of the metadata attributes of the tag selected from the second panel.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A historian system comprising:
    one or more computers comprising one or more processors and one or more non-transitory computer readable media, the one or more non-transitory computer readable media having instructions stored thereon that when executed cause the one or more computers to implement:
    a graphical user interface (GUI), including:
        a header configured to provide GUI navigation capability for the historian system, the header being located near a top portion of the GUI;
        a tag search area configured to enable a search and selection of tags stored in the historian, the tag search area being included in the header;
        a tag summary area configured to display graphical representations of tags selected in the tag search area, the selected tags being contextualized based on the metadata values describing the selected tags, and an optimal visualization scheme for the selected tags being determined; and
        a tag detail area configured to display graphical representations of values associated with the contextual selected tags in the tag summary area, wherein at least two values associated with the selected tags are grouped together for display in the tag detail area as a single graphical representation when the graphical representations of the values associated with the selected tags exceed at least one boundary of the GUI.

2. The historian system of claim 1,
    further comprising a data series area;
    wherein the data series area is configured to display tags comprising a group of one or more tags selected in the tag summary area.

3. The historian system of claim 2,
    wherein the data series area is configured to allow a user the GUI to select and deselect displayed tags to plot a selected chart in the tag detail area.

4. The historian system of claim 3,
    wherein the GUI is configured to enable a user to view details of each tag in the data series area by selecting a tag details option near each tag.

5. The historian system of claim 1,
    further comprising a chart gallery area;
    wherein the chart gallery area is configured to display different charts applicable for a selected tag group in the tag summary area.

6. The historian system of claim 5,
    wherein a selection of a chart via the GUI will display a respective chart type in the tag detail area.

7. The historian system of claim 5,
    wherein the GUI is configured to enable a user to switch between different chart types for a set of selected tags.

8. The historian system of claim 7,
    wherein the different chart types include one or more of a summary chart, a time in state chart, a summary grid, and a diagnostic grid.

9. A historian system comprising:
    one or more computers comprising one or more processors and one or more non-transitory computer readable media, the one or more non-transitory computer readable media having instructions stored thereon that when executed cause the one or more computers to implement:

a graphical user interface (GUI), including:
- a tag summary area configured to display graphical representations of tags selected in the tag search area, the selected tags being contextualized based on the metadata values describing the selected tags, and an optimal visualization scheme for the selected tags being determined;
- a tag detail area configured to display graphical representations of values associated with the contextualized selected tags in the tag summary area, wherein at least two values associated with the selected tags are grouped together for display in the tag detail area as a single graphical representation when the graphical representations of the values associated with the selected tags exceed at least one boundary of the GUI; and
- a tag search area configured to enable a search and a selection of tags stored in the historian system, the tag search area comprising a first panel, a second panel, and a third panel, wherein each of the first panel, the second panel, and the third panel comprise a results section that displays results in response to a search query.

10. The historian system of claim 9, wherein the first panel is configured to display tags that match the search query.

11. The historian system of claim 10, wherein the first panel is configured to display one or more subgroups of the tags.

12. The historian system of claim 11, wherein the second panel is configured to display the tags of a selected group of the one or more subgroups.

13. The historian system of claim 12, wherein the third panel is configured to display tag metadata details of a selected tag of the tags displayed in the second panel.

14. The historian system of claim 13, wherein the tag metadata details include one or more of a tag name, a source, a data type, a unit of measure, a range, an interpolation, and a description.

15. The historian system of claim 13, wherein the third panel includes an add tag option.

16. The historian system of claim 15, wherein selection of the add tag option is configured to add the tag to the tag detail area.

17. The historian system of claim 9, further comprising a data series area; wherein the data series area is configured to display tags comprising a group of one or more tags selected in the tag summary area.

18. The historian system of claim 9, further comprising a chart gallery area; wherein the chart gallery area is configured to display different charts applicable for a selected tag group in the tag summary area.

* * * * *